United States Patent
Kim et al.

(10) Patent No.: US 10,884,133 B2
(45) Date of Patent: Jan. 5, 2021

(54) POSITIONING SYSTEM FOR GLOBAL NAVIGATIONAL SATELLITE SYSTEM

(71) Applicant: Mitsubishi Electric Research Laboratories, Inc., Cambridge, MA (US)

(72) Inventors: Kyeong Jin Kim, Lexington, MA (US); Dongyang Xu, Fort Collins, CO (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 696 days.

(21) Appl. No.: 15/474,176

(22) Filed: Mar. 30, 2017

(65) Prior Publication Data
US 2018/0284287 A1 Oct. 4, 2018

(51) Int. Cl.
*G01S 19/22* (2010.01)
*G01S 19/43* (2010.01)
*G01S 19/44* (2010.01)

(52) U.S. Cl.
CPC .............. *G01S 19/22* (2013.01); *G01S 19/43* (2013.01); *G01S 19/44* (2013.01)

(58) Field of Classification Search
CPC ............. G01S 19/22; G01S 1/43; G01S 19/44
See application file for complete search history.

(56) References Cited

U.S. PATENT DOCUMENTS

| 8,188,913 | B2* | 5/2012 | Henkel | G01S 19/44 342/357.4 |
| 2007/0075896 | A1* | 4/2007 | Whitehead | G01S 19/53 342/357.36 |

(Continued)

OTHER PUBLICATIONS

Crassidis et al., "Global Positioning System Integer Ambiguity Resolution without Attitude Knowledge." Journal of Guidance, Control, and Dynamics, 1999. pp. 1-22.

(Continued)

*Primary Examiner* — Erin F Heard
*Assistant Examiner* — Donald H B Braswell
(74) *Attorney, Agent, or Firm* — Gennadiy Vinokur; James McAleenan; Hironori Tsukamoto

(57) ABSTRACT

A positioning system for global navigational satellite system (GNSS) includes a first receiver to measure a first carrier phase of a carrier signal emitted by a satellite and a second receiver to measure a second carrier phase of the carrier signal emitted by the satellite. The, first carrier phase includes a first carrier phase ambiguity as an unknown integer number of wavelengths of the carrier signal travelled between the satellite and the first receiver. Similarly, the second carrier phase includes a second carrier phase ambiguity as an unknown integer number of wavelengths of the carrier signal travelled between the satellite and the second receiver. The GNSS includes a processor to determine an integer ambiguity difference between the first carrier phase ambiguity and the second carrier phase ambiguity from a difference in the measurements of the first carrier phase and the second carrier phase and to detect a multipath of the carrier signal based on a value of the integer ambiguity difference and tracked set of integer ambiguity differences.

20 Claims, 11 Drawing Sheets

(56) References Cited

U.S. PATENT DOCUMENTS

| | | | | |
|---|---|---|---|---|
| 2012/0176271 | A1* | 7/2012 | Dai | G01S 19/04 |
| | | | | 342/357.44 |
| 2014/0240172 | A1* | 8/2014 | Milyutin | G01S 19/20 |
| | | | | 342/357.51 |
| 2015/0048973 | A1* | 2/2015 | Whitehead | G01S 19/20 |
| | | | | 342/357.58 |

OTHER PUBLICATIONS

Raquet., "Multiple GPS Receiver Multipath Mitigation Technique," IEEE Proceedings, Radar, Sonar & Navigation, Institution of Electrical Engineers, GB, vol. 149, No. 4, Aug. 2, 2002. pp. 195-201.

Ray et al., "Use o fMultiple Antennas to Mitigate Carrier Phase Multipath in Reference Stations," GPS 1999, Proceedings of the 12th international technical meeting of the satellite division of the institute of navigation, The institute of Navigation, 8551 Rixlew Lane Suite 360, Manassas, VA 20109, USA, Sep. 17, 1999. pp. 269-280.

Ray et al., "Mitigation of the Static Carrier Phase Multipath Effects using Multiple Closely Spaced Antennas," Navigation, Journal of the institute of navigation, institute of navigation, Fairfax, VA, US. vol. 46, No. 3, Dec. 1, 1999. pp. 193-202.

Moradi et al., "Reducing GPS Wide Lane Ambiguity Resolution Time, A Novel Carrier Phase Multipath Mitigation Technique," ITM 2013, Proceedings of the 2013 International Technical Meeting of the institute of navigation, The institute of Navigation, 8551 Rixlew Lane Suite 360, Manassas, VA 20109, USA. Jan. 27, 2013, pp. 343-350.

\* cited by examiner $$\nabla\Delta\tilde{\beta} = \begin{Bmatrix} \nabla\Delta\tilde{\beta}_1(1) & \nabla\Delta\tilde{\beta}_2(1) & \cdots & \nabla\Delta\tilde{\beta}_{W_1}(1) & \nabla\Delta\tilde{\beta}_{W_1+1}(1) & \cdots & \nabla\Delta\tilde{\beta}_M(1) \\ \nabla\Delta\tilde{\beta}_1(2) & \nabla\Delta\tilde{\beta}_2(2) & \cdots & \nabla\Delta\tilde{\beta}_{W_1}(2) & \nabla\Delta\tilde{\beta}_{W_1+1}(2) & \cdots & \nabla\Delta\tilde{\beta}_M(2) \\ \vdots & \vdots & \vdots & \vdots & \vdots & \vdots & \vdots \\ \nabla\Delta\tilde{\beta}_1(n) & \nabla\Delta\tilde{\beta}_2(n) & \cdots & \nabla\Delta\tilde{\beta}_{W_1}(n) & \nabla\Delta\tilde{\beta}_{W_1+1}(n) & \cdots & \nabla\Delta\tilde{\beta}_M(n) \\ \vdots & \vdots & \vdots & \vdots & \vdots & \vdots & \vdots \\ \nabla\Delta\tilde{\beta}_1(N-1) & \nabla\Delta\tilde{\beta}_2(N-1) & \cdots & \nabla\Delta\tilde{\beta}_{W_1}(N-1) & \nabla\Delta\tilde{\beta}_{W_1+1}(N-1) & \cdots & \nabla\Delta\tilde{\beta}_M(N-1) \end{Bmatrix} \Big\} 400$$

FIG. 4

POSITIONING SYSTEM FOR GLOBAL NAVIGATIONAL SATELLITE SYSTEM

TECHNICAL FIELD

This invention relates generally to a global navigational satellite system (GNSS), and more particularly to detection of multipath of carrier signals emitted by satellites for position estimations.

BACKGROUND

A Global Navigation Satellite System (GNSS) is a system of satellites that can be used for determining the geographic location of a mobile receiver with respect to the earth. GNSS include GPS, Galileo, Glonass and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile, with the purpose of achieving quicker and more accurate calculation of the mobile's geographic position.

Various position estimation methods are known wherein the position calculations are based on repeated measurement of the so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles and/or an integer number of wavelength that have elapsed before a lock-in to this signal alignment has been obtained, which number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

Several methods for position estimation based on Integer Ambiguity Resolution (IAR) that resolve carrier phase ambiguity have been proposed, wherein carrier phase ambiguities are estimated in real time, that is based on measurement of GNSS observables by a network of reference stations. For example, some methods use differencing the carrier phases measured by different receives at the same epoch and/or emitted by different satellites. For example, if the position of receiver 1 is known but the position of receiver 2 unknown, it may be possible to estimate the position of receiver 2 using numerical root finding and least squares. See, e.g., U.S. 2016/0077213 describing a method for integer ambiguity-fixed precise point positioning. However, in a number of practical applications, the positions of different receivers are unknown.

SUMMARY

Some embodiments are based on recognition that the carrier phase measurements are more precise than the code measurements (about two orders of magnitude), but include unknown ambiguities, such as tropospheric and ionospheric delays, as well as a carrier phase ambiguity related unknown integer number of wavelengths of the carrier signal travelled between the satellite and the receiver. If the ambiguities are resolved, the carrier phase measurements can lead to more accurate position estimation. The carrier phase measurements ambiguities can be partially resolved by taking a difference of signals received by multiple, e.g., two receivers, which cancel at least some of the ambiguities. In this difference, some of the ambiguities are cancelled out. However, remaining ambiguities include carrier phase ambiguity.

Some embodiments are based on a realization that even partially resolved carrier phase ambiguity in a carrier signal can be used as an index for detecting multipath of the carrier signal. Hence, there is no need to resolve all those carrier phase ambiguities to detect multipath necessary to estimate the position of the receivers. For multipath detection, it is sufficient to work with known relative positions of the receivers. If the multipath is not detected, a position of a receiver can be estimated by various methods using at least one of a code signal and the carrier signal emitted by the satellite.

Specifically, some embodiments take a difference between carrier phases of a carrier signal measured by different receivers, e.g., a first receiver and a second receiver, to estimate an integer difference between carrier phase ambiguities in those measurements. This integer difference, referred herein as integer ambiguity difference, is used as an index indicating a presence of the multipath of the carrier signal. For example, the multipath can be detected in response to an impulse change in the values of the integer ambiguity difference.

Some embodiments are based on realization that the integer ambiguity difference can be determined even without knowing the carrier phase ambiguities. For example, the integer ambiguity difference can be determined using a geometric relationship between the satellite and the first and second receivers connecting the integer ambiguity difference with a relative positions error of the first and the second receivers and a difference between the measurements of the first carrier phase and the second carrier phase. Knowing the integer ambiguity difference is insufficient for determining the carrier phase ambiguity, but is sufficient to serve as an index indicating multipath of the carrier signal.

In some embodiments, the integer ambiguity difference is updated over a set of measurements to iteratively reduce the relative positions error in the geometric relationship and to drive a distance between the relative positions of the first and the second receivers toward the predetermined distance. When the relative positions error is approaching zero value, the geometric relationship is used to determine the integer ambiguity difference.

Some embodiments track values of the integer ambiguity difference over a period of time to produce a variance of a distribution of tracked values of the integer ambiguity difference. This distribution can be used to detect an impulse change in the value of the integer ambiguity difference. For example, one embodiment determines the distribution as a probability distribution and determines a variance of that probability distribution. The embodiment detects the multipath when a deviation of the value of the integer ambiguity difference from the distribution greater than the variance.

Some embodiments test a set of satellites for the presence of multipath in the carrier signals emitted by those satellites. Typically, the set of satellites includes at least six satellites allowing rejecting at least one satellite for position estimation. For example, one embodiment test multipath of each satellite individually and independently of testing other satellites. This embodiment allows identifying a particular satellite effecting accuracy of position estimation without the need for additional computation.

Additionally, or alternatively, one embodiments test the set of satellites collectively. This embodiment reduces the computational burden for the situations where no multipath is detected. However, when the multipath is detected the embodiment performs additional calculations to identify the particular satellites causing the multipath.

Accordingly, one embodiment discloses a positioning system for global navigational satellite system (GNSS) that includes a first receiver to measure a first carrier phase of a carrier signal emitted by a satellite, wherein the first carrier phase includes a first carrier phase ambiguity as an unknown integer number of wavelengths of the carrier signal travelled between the satellite and the first receiver; a second receiver to measure a second carrier phase of the carrier signal emitted by the satellite, wherein the second carrier phase includes a second carrier phase ambiguity as an unknown integer number of wavelengths of the carrier signal travelled between the satellite and the second receiver; and a processor to determine an integer ambiguity difference between the first carrier phase ambiguity and the second carrier phase ambiguity from a difference in the measurements of the first carrier phase and the second carrier phase and to detect a multipath of the carrier signal based on a value of the integer ambiguity difference.

Another embodiment discloses a method for position estimation by a global navigational satellite system (GNSS) including a first receiver, a second receiver spatially separated from the second receiver over a predetermined distance, and a processor coupled with stored instructions implementing the method, wherein the instructions, when executed by the processor carry out at least some steps of the method. The method includes measuring a first carrier phase of a carrier signal emitted by a satellite, wherein the first carrier phase includes a first carrier phase ambiguity as an unknown integer number of wavelengths of the carrier signal travelled between the satellite and the first receiver; measuring a second carrier phase of the carrier signal emitted by the satellite, wherein the second carrier phase includes a second carrier phase ambiguity as an unknown integer number of wavelengths of the carrier signal travelled between the satellite and the second receiver; determining an integer ambiguity difference between the first carrier phase ambiguity and the second carrier phase ambiguity from a difference in the measurements of the first carrier phase and the second carrier phase; detecting a multipath of the carrier signal based on a value of the integer ambiguity difference; rejecting the satellite from the position estimation when the multipath is detected; and otherwise estimating a position of at least one of the first receiver and the second receiver using at least one of a code signal and the carrier signal emitted by the satellite.

Yet another embodiment discloses a non-transitory computer readable storage medium embodied thereon a program executable by a processor for performing a method for position estimation by a global navigational satellite system (GNSS) including a first receiver and a second receiver spatially separated from the second receiver over a predetermined distance. The method includes measuring a first carrier phase of a carrier signal emitted by a satellite, wherein the first carrier phase includes a first carrier phase ambiguity as an unknown integer number of wavelengths of the carrier signal travelled between the satellite and the first receiver; measuring a second carrier phase of the carrier signal emitted by the satellite, wherein the second carrier phase includes a second carrier phase ambiguity as an unknown integer number of wavelengths of the carrier signal travelled between the satellite and the second receiver; determining an integer ambiguity difference between the first carrier phase ambiguity and the second carrier phase ambiguity from a difference in the measurements of the first carrier phase and the second carrier phase; detecting a multipath of the carrier signal based on a value of the integer ambiguity difference; rejecting the satellite from the position estimation when the multipath is detected; and otherwise estimating a position of at least one of the first receiver and the second receiver using at least one of a code signal and the carrier signal emitted by the satellite.

BRIEF DESCRIPTION OF THE DRAWINGS

FIG. 4 shows an example of detection statistics used by some embodiments.

DETAILED DESCRIPTION

Figure 1A:
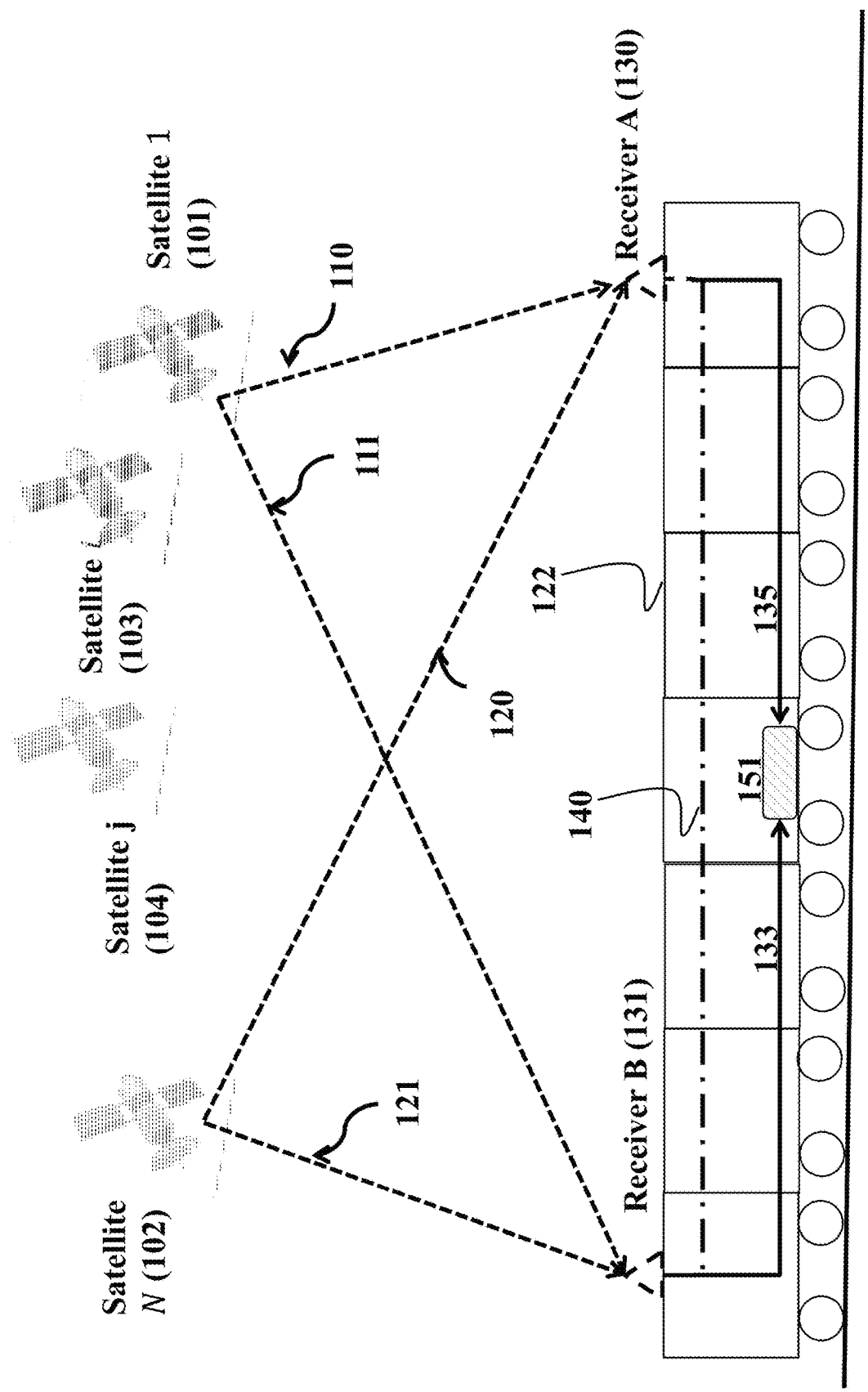
FIG. 1A shows a block diagram of global navigational satellite system (GNSS) according to some embodiments.
Figure 1B:
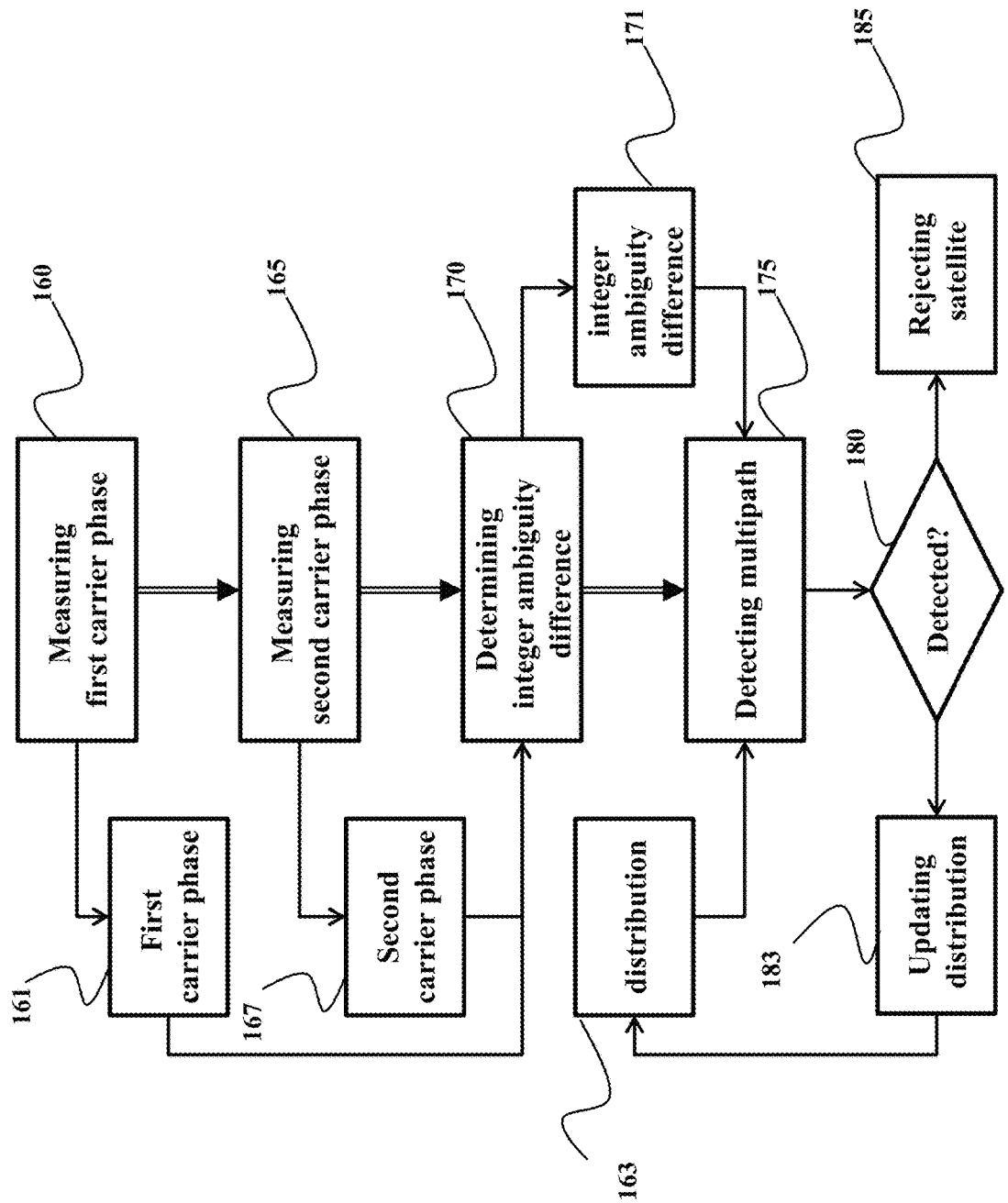
FIG. 1B shows a block diagram of a method for position estimation used by some implementations of GNSS of FIG. 1A.

FIG. 1A shows a block diagram of global navigational satellite system (GNSS) according to some embodiments. FIG. 1B shows a block diagram of a method for position estimation used by some implementations of GNSS of FIG. 1A. The GNSS includes a first receiver 130 to measure 160 a first carrier phase 161 of a carrier signal emitted by a satellite 101. The first carrier phase includes a first carrier phase ambiguity as an unknown integer number of wavelengths of the carrier signal travelled 110 between the satellite and the first receiver. Similarly, the GNSS includes a second receiver 131 to measure 165 a second carrier phase 167 of the carrier signal emitted by the satellite. The second carrier phase includes a second carrier phase ambiguity as an unknown integer number of wavelengths of the carrier signal travelled 111 between the satellite and the second receiver.

The first receiver 130 is spatially separated from the second receiver 131 over a predetermined distance 140. The multipath detection is performed by a processor 151 operatively connected to the first and the second receivers. For example, the processor 151 collects the phase lock loop (PLL) outputs (133) and (135) from two receivers (130) and (131) to perform the multipath detection and position estimation.

Some embodiments are based on a realization that even partially resolved carrier phase ambiguity in a carrier signal can be used as an index for detecting multipath of the carrier signal. Hence, there is no need to resolve all those carrier phase ambiguities to detect multipath necessary to estimate the position of the receivers. For multipath detection, it is sufficient to work with known relative positions of the receivers. If the multipath is not detected, a position of a receiver can be estimated by various methods using at least one of a code signal and the carrier signal emitted by the satellite.

Specifically, some embodiments take a difference between carrier phases of a carrier signal measured by different receivers, e.g., a first receiver and a second receiver, to estimate an integer difference between carrier phase ambiguities in those measurements. This integer difference, referred herein as integer ambiguity difference, is used as an index indicating a presence of the multipath of the carrier signal. For example, the multipath can be detected in response to an impulse change in the values of the integer ambiguity difference.

For example, in some embodiments, the processor 151 is configured to determine 170 an integer ambiguity difference 171 between the first carrier phase ambiguity and the second carrier phase ambiguity from a difference in the measurements of the first carrier phase 161 and the second carrier phase 162 and to detect 175 a multipath of the carrier signal based on a value of the integer ambiguity difference.

For example, some embodiments track values of the integer ambiguity difference over a period of time to produce a distribution 163 of tracked values of the integer ambiguity difference. The processor detects 180 the multipath by comparing the integer ambiguity difference 171 with the distribution 163, e.g., by estimation a deviation of the integer ambiguity difference 171 from the distribution. For example, the processor, in response to determining a value of the integer ambiguity difference at an instant of time, can detect the multipath when a deviation of the integer ambiguity difference from the distribution is above a threshold. If multipath is detected 180, the processor rejects 185 the satellite from the position estimation. Otherwise, the processor updates 183 the distribution with the value of the integer ambiguity difference and perform the position estimation using at least one of a code signal and the carrier signal emitted by the satellite.

In some examples, the GNSS estimates a position of a train. For example, two GNSS receivers (130) and (131) installed at different places on the train 122. For the carrier phase double differencing, a set of satellites 101, 102, 103, and 104 in view are used to receive multiple carrier signals travelled over distances 101, 11, 120, and 121. In some embodiments the set of satellites include at least six satellites. Each carrier signal received by each includes a different integer ambiguity.

In some examples, the GNSS uses the carrier phase single difference (SD) and/or double difference (DD) for estimating a position. When a carrier signal transmitted from one satellite is received by two receivers the difference between the first carrier phase and the second carrier phase is referred as the single difference (SD) in carrier phase. Using pairs of antennas, the difference between SDs in carrier phase obtained from the radio signals from the two satellites is called the double difference (DD) in carrier phase. When the carrier phase difference is converted into the number of wave length, for example, $\lambda=19$ cm for L1 GPS signal, it is separated by fractional and integer parts. The fractional part can be measured by the positioning apparatus, whereas the positioning device is not able to measure the integer part directly. Thus, the integer part is referred to as integer bias or integer ambiguity.

In some embodiments, a physical distance between the receiver A (130) and receiver B (131) is fixed and known as $l_{AB}=\|\Delta r_{AB}\|$, where $\Delta r_{AB}=[\Delta X_{AB}\, \Delta Y_{AB}\, \Delta Z_{AB}]^T$ is the relative position vector between receiver A and receiver B, and is a measurement of interest, for which it is desirable to ensure its integrity. A set of N tracked satellites are in view, N>=6. Some embodiments use M time instances of single-frequency ($L_1$) GPS signal measurements to determine the multipath.

Figure 2:
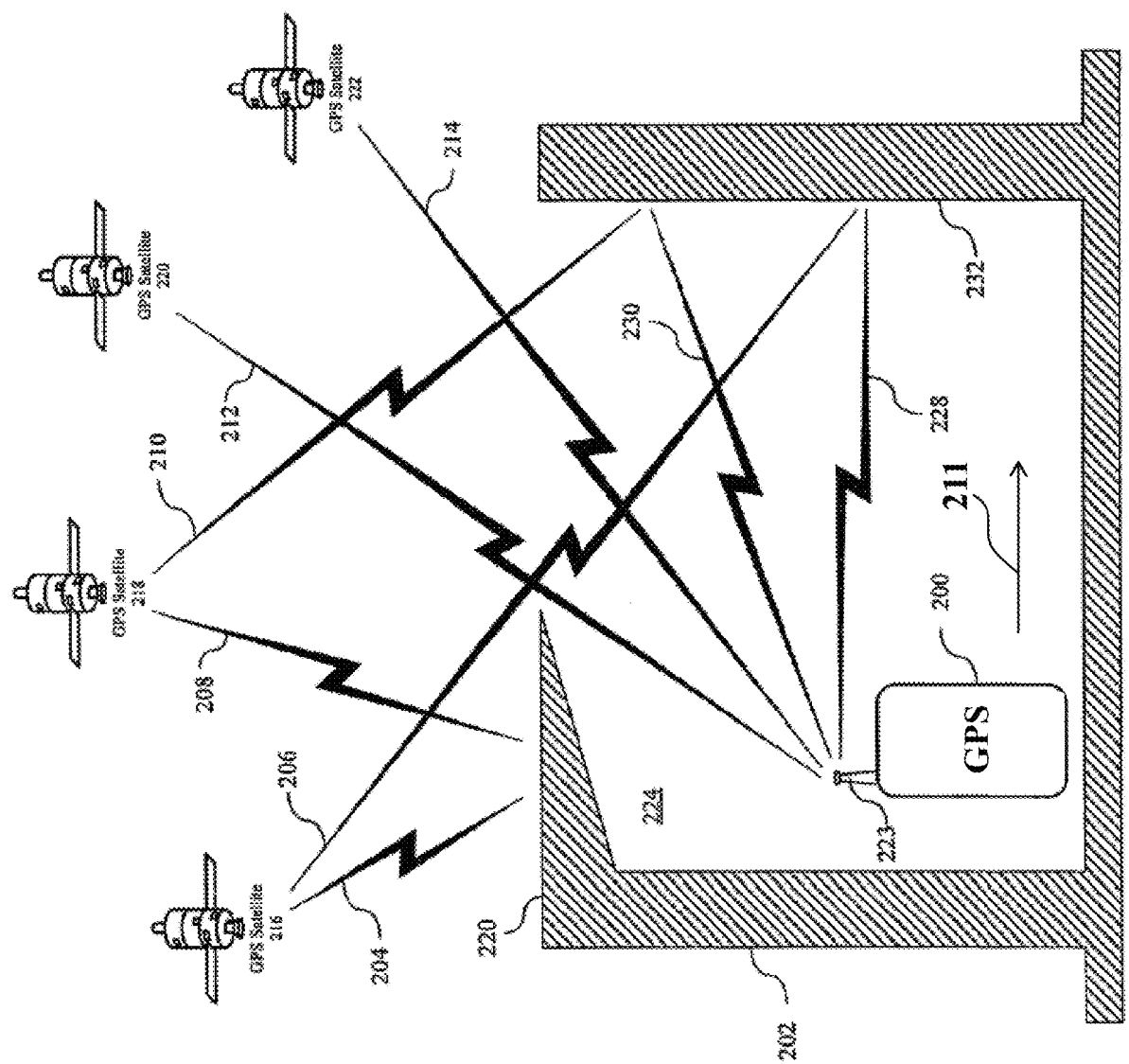
FIG. 2 shows a schematic of a GNSS receiver moving in a multipath environment.

FIG. 2 shows a schematic of a GNSS receiver 200 moving 211 in a multi-path environment. The GNSS receiver 200 can be located in proximity with a structure 202 that partially blocks some to the GNSS signals 204, 206, 208, and 210 from GNSS satellites 216, and 218, respectively. The structure 202, as an example, may be a building, natural or man-made environmental structure, such as a canyon wall or street in a city with tall building. However, the structure 202 does not block the GNSS signals 212, and 214 from GNSS satellites 220, and 222. As the GPS 200 moves, the combination of blocked and received GPS signals from different satellites changes over time.

In this example, a GNSS antenna 223 receives signals from each GNSS satellite 216, 218, 220, and 222 via multiple paths reflected from the blockage or possible objects in the structure 202. The multi-path signals can result in constructive or destructive interference, with constructive interference increasing signal power and destructive interference reducing signal power. Generally, when the GNSS antenna 223 receives destructive multi-path interference, also known as "flat fading." the signal cannot be recovered.

Specifically, as an example, GNSS signals 204 and 208 are blocked by part 220 of the structure 202 while GNSS signals 206, 210, 212, and 214 pass though free space 224. However, in this example, only GNSS signals 212 and 214 are directly received by GNSS receiver 200 while GNSS signals 206 and 210 are indirectly received by the GNSS receiver 200 via multi-path GNSS signals 228 and 230, respectively that are reflected off of another structure 232.

Another possibility of multi-path propagation is a combination of a direct line-of-sight GNSS signal is available with reflected, non-line-of-sight or delayed version of that GNSS signal. In this case the two versions of the GNSS signal can potentially have different amplitudes, phases, and frequencies. Various embodiments if the invention is designed to detect the presence of any type of multipath GNSS signals.

Various embodiments avoid usage of multipath GPS signals for satellite navigation because multipath GNSS signals give less accuracy and in satellite navigation, accuracy was and remains the prime goal. By comparing the parameters of the received GNSS signals, the embodiments can select the satellites with a direct line-of-sight (LOS) with the GNSS receivers and use the GP GNSS S signals of only those satellites in GNSS navigation.

Some embodiments are based on realization that the integer ambiguity difference can be determined using a geometric relationship between the satellite and the first and second receivers connecting the integer ambiguity difference with a relative positions error of the first and the second receivers and a difference between the measurements of the first carrier phase and the second carrier phase. Knowing the integer ambiguity difference is insufficient for determining the carrier phase ambiguity, but is sufficient to serve as an index indicating multipath of the carrier signal.

Figure 3:
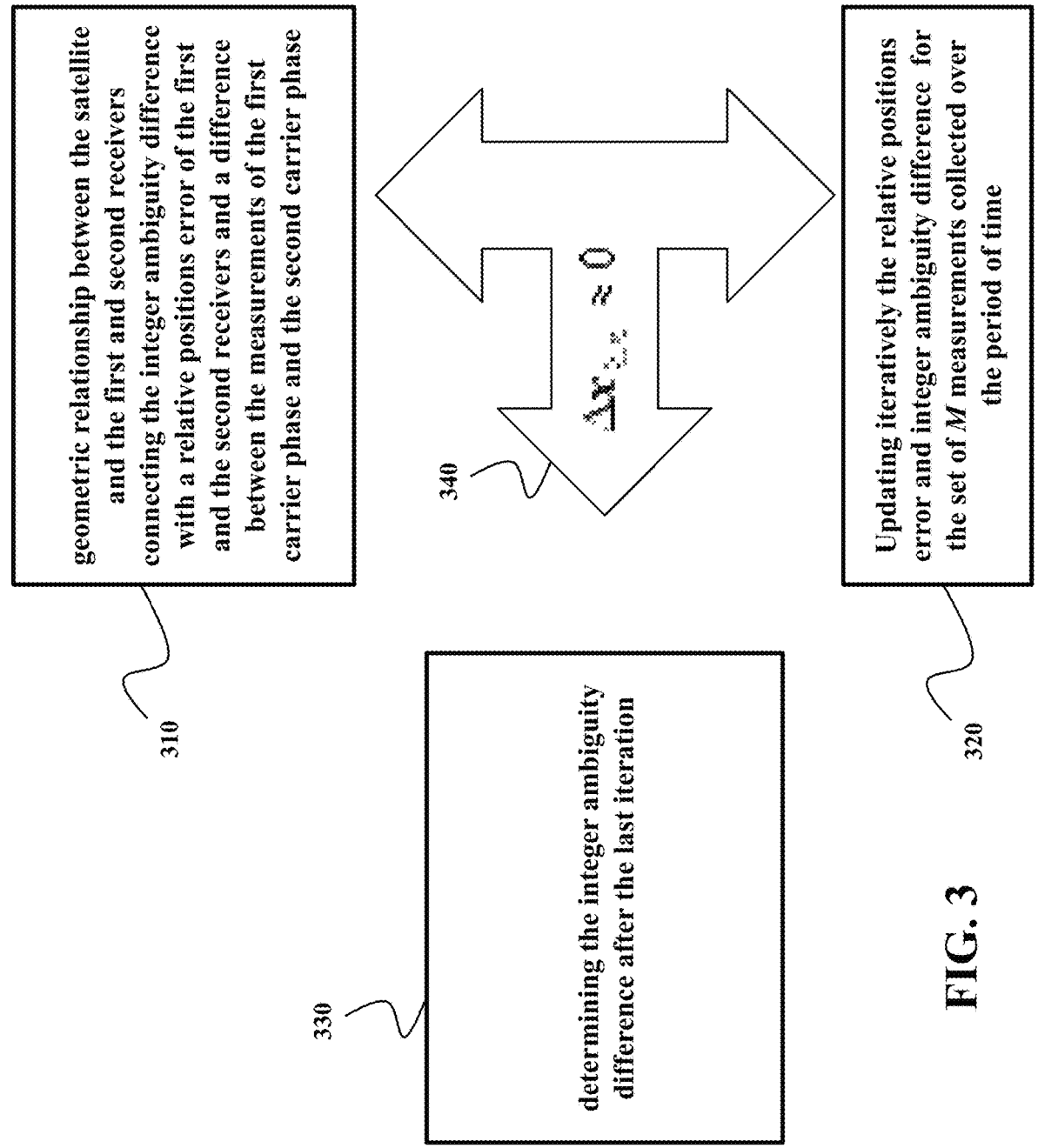
FIG. 3 shows a schematic of iterative update of the relative positions error and integer ambiguity difference according to some embodiments.

FIG. 3 shows a schematic of iterative update of the iteratively the relative positions error and integer ambiguity difference according to some embodiments.

In those embodiments, the integer ambiguity difference is updated over a set of measurements to iteratively reduce the relative positions error in the geometric relationship and to drive a distance between the relative positions of the first and the second receivers toward the predetermined distance. When the relative positions error is approaching zero value, the geometric relationship is used to determine the integer ambiguity difference.

For example, the processor 151 determines 330 the integer ambiguity difference according to a geometric relationship 310 between the satellite and the first and second receivers connecting the integer ambiguity difference with a relative positions error of the first and the second receivers and a difference between the measurements of the first carrier phase and the second carrier phase. The determining iteratively updates 320 the integer ambiguity difference to reduce the relative positions error over a set of measurements of the first carrier phase and the second carrier phase and to drive 340 a distance between the relative positions of the first and the second receivers toward the predetermined distance.

For example, the geometric relationship includes $$l(k,n) = A(k,n)\Delta x(k,n) + \lambda \nabla \Delta \beta + w_{\nabla \Delta \Phi_{AB}},$$

wherein $\nabla \Delta \beta$ is the integer ambiguity difference, $\Delta x(k,n)$ is the relative positions error of the first receiver and the second receiver at iteration n and at measurement k, and $l(k,n)$ is the difference between the measurements of the first carrier phase and the second carrier phase, $A(k,n)$ is a geometric matrix of the geometric relationship between the satellite and the first and second receivers, $\lambda$ is the wavelength of the first and the second carrier signals, and $w_{\nabla \Delta \Phi_{AB}}$ represents an error in the measurements plus noise.

Using this geometrical relationship, one embodiment iteratively updates 320 the relative positions error for the set of M measurements collected over the period of time to drive or to force $\Delta x_{k,n} \approx 0$ 340 at the last iteration, $n_{end}$, and determines 330 the integer ambiguity difference after the last iteration according to $$\nabla \Delta \hat{\beta}_{int} = \text{round}\left(\left(\frac{1}{\lambda M}\right) \sum_{k=1}^{M} l_{k,n_{end}}\right).$$

For example, the carrier phase measurement received at the receiver A ($R_A$) is given by:

$$\lambda \phi_A^i = \rho_A^i + c \cdot (\delta_A - \delta^i) + T_A^i - I_A^i + \lambda \beta_A^i + w_{\phi_A^i} \qquad (1)$$

where $\lambda$ is the wavelength, c denotes the speed of light, $\mu_A^i$ is the range from $R_A$ to satellite i, $\delta_A$ is the receiver clock bias, $\delta^i$ is the satellite clock bias, $T_A^i$ is the tropospheric delay, $I_A^i$ is the ionospheric delay, $\beta_A^i$ is the integer ambiguity, and $w_{\phi_A^i}$ is the carrier phase measurement error.

The single differencing (SD) carrier phase between two receivers is given by $$\lambda \Delta \Phi^i = (\rho_A^i - \rho_B^i) + c \cdot (\delta_A - \delta_B) + \lambda (\beta_A^i - \beta_B^i) + w_{\phi_A^i} - w_{\phi_B^i} \qquad (2)$$

which can be approximated by $$\lambda \Delta \Phi^i \approx (\rho_A^i - \rho_B^i) + c \cdot (\delta_A - \delta_B) + \lambda \Delta \beta^i + \Delta w_{\phi^i} \qquad (3)$$

under the assumption that there are no atmospheric delay differences in two receivers; that is, $T_A^i \approx T_B^i$, $I_A^i \approx I_B^i$. This has been stated to be valid in a short relative distance case of $l_{AB} \leq 10$ km. We also define $\Delta \beta^i = \beta_A^i - \beta_B^i$ and $\Delta w_{\phi^i} = w_{\phi_A^i} - w_{\phi_B^i}$. By using carrier phase measurements from two satellites i and j, the double differencing (SD) carrier phase is given by $$\lambda \nabla \Delta \Phi^{ij} = \lambda \Delta \Phi^i - \lambda \Delta \Phi^j = (\rho_A^i - \rho_B^i) - (\rho_A^j - \rho_B^j) + \lambda (\beta_A^i - \beta_B^i) + w_{\nabla \Delta \Phi} = (\rho_A^i - \rho_B^i) - (\rho_A^j - \rho_B^j) + \lambda \nabla \Delta \beta^{ij} + \nabla \Delta w_{\phi}^{ij} \qquad (4)$$

where $\nabla \Delta \beta^{ij} = \Delta \beta^i - \Delta \beta^j$ and $\nabla \Delta w_{\Phi}^{ij} = \Delta w_{\phi}^i - \Delta w_{\phi}^j$.

In the development of the IAR-based integrity monitoring incorporated with the double differencing or single differencing carrier phase, some embodiments use the following assumption:

For at least one of the receiver, the pseudo range solution by the code phase measurement is available, and here it is assumed to be B, and the pseudo range solution of receiver B at time instance k is given by:

$$\hat{r}_{B,k} = \hat{r}_{B,k}(\hat{T}_{B,k}) = [\hat{X}_{B,k}(\hat{T}_{B,k}) \hat{Y}_{B,k}(\hat{T}_{B,k}) \hat{Z}_{B,k}(\hat{T}_{B,k})]^T \qquad (5)$$

where $\hat{T}_{B,k}$ denoting the estimated reception time at receiver B for time instance k.

Based on $\hat{r}_{B,k}(\hat{T}_{B,k})$, the pseudorange solution for receiver A is given by $$\hat{r}_{A,k} = \hat{r}_{A,k}(\hat{T}_{B,k}) \qquad (6)$$
$$= [\hat{X}_{A,k}(\hat{T}_{B,k}) \ \hat{Y}_{A,k}(\hat{T}_{B,k}) \ \hat{Z}_{A,k}(\hat{T}_{B,k})]^T$$
$$= \hat{r}_{B,k}(\hat{T}_{B,k}) + \Delta \hat{r}_{AB,k}$$

Note that w.l.o.g. $\hat{T}_{B,k}$ and the subscript AB will not be included in the following equations to simplify our notation. Using code phase solution obtained from receiver B, the SD and DD carrier phase measurements can be written as $$\lambda \Delta \phi^i = \tilde{\rho}_A^i - \hat{\rho}_B^i + c \cdot (\delta_A - \delta_B) + \lambda \Delta \beta^i + w_{\nabla \Delta \phi}^i \qquad (7)$$

$$\lambda \nabla \Delta \phi^{ij} = (\tilde{\rho}_A^i - \tilde{\rho}_A^j) - (\hat{\rho}_B^i - \hat{\rho}_B^j) + \lambda \nabla \Delta \beta^{ij} + w_{\nabla \Delta \phi}^{ij} \qquad (8)$$

where $\tilde{\rho}_A^i$ and $\tilde{\rho}_A^j$ denote the pseudorange measurements that need to be simultaneously updated during the following integer ambiguity solution iteration, whereas the $\hat{\rho}_B^i$ and $\hat{\rho}_B^j$ are already available as has been stated earlier, hence the difference in the overhead signs "~" and "^". The estimated ranges at receiver B are, respectively, given by $\rho_B^i = \|\hat{r}_B - r^i\|$ and $\rho_B^j = \|\hat{r}_B - r^j\|$, where $r^i$ and $r^j$ are the positions of satellite i and j.

However, the ranges $\tilde{\rho}_A^i$ and $\tilde{\rho}_A^j$ being estimated are nonlinear with respect to the position of receiver A, we first apply the first order linearization in the direction from satellite i to receiver A with respect to the current (nth) iteration of $\tilde{r}_{A,k}$, $\tilde{r}_{A,k,n}$, as follows:

$$\tilde{p}^i_{A,k} \approx \tilde{p}^i_{A,k,n} + \frac{(\tilde{r}_{A,k,n} - r^i)^T \Delta x_{k,n}}{\tilde{p}^i_{A,k,n}} \quad (9)$$

$$\phantom{xxxxxxxxxxxxxxxxxxxxxxxxxx} J_1$$

where $$\tilde{p}^i_{A,k,n} = \|\tilde{r}_{A,k,n} - r^i\|, \quad (10)$$

$$\tilde{r}_{A,k,n} = [\tilde{X}_{A,k,n} \quad \tilde{Y}_{A,k} \quad \tilde{Z}_{A,k}]^T = \hat{r}_{B,k} + \Delta \tilde{r}_{AB,k,n} \text{ and}$$

$$\Delta \tilde{x}_{k,n} = [\Delta X_k - \Delta \tilde{X}_{AB,k,n} \quad \Delta Y_k - \Delta \tilde{Y}_k \quad \Delta Z_k - \Delta \tilde{Z}_{k,n}]^T$$

with $\Delta \tilde{x}_{k,n}$ denoting a displacement incremental in the relative distance, and $\Delta \tilde{r}_{AB,k,n}$ denoting the nth estimate of the relative distance vector between two receivers at time instance k. For the next iteration, $\Delta \tilde{r}_{AB,k,n}$ and $\tilde{r}_{A,k,n}$ can be updated as follows:

$$\Delta \tilde{r}_{AB,k,n+1} = \Delta \tilde{r}_{AB,k,n} + \Delta \tilde{x}_k \text{ and } \tilde{r}_{A,k,n+1} = \hat{r}_{B,k} + \Delta \tilde{r}_{AB,k,n+1} \quad (11)$$

$\Delta \tilde{x}_{k,n}$ denotes the optimized solution provided by the proposed approach for time instance k and iteration n. Note that in (9), denotes the unit vector from satellite i to receiver A at iteration n for time instance k, so that $J_1$ denotes the projection of $\Delta \tilde{x}_{k,n}$ onto the direction from satellite i to receiver A.

Substituting (10) into (8), we can have the following form for SD and DD carrier phase:

$$\lambda \Delta \phi^i_k \approx \tilde{p}^i_{A,k,n} + \frac{(\tilde{r}_{A,k,n} - r^i)^T \Delta x_{k,n}}{\tilde{p}^i_{A,k,n}} - \hat{p}^i_B(k) + \lambda \Delta \beta^i_{AB} + w_{\Delta \phi^i_{AB}} \quad (12)$$

$$\lambda \nabla \Delta \phi^{ij}_k \approx \tilde{p}^i_{A,k,n} - \tilde{p}^j_{A,k,n} + \frac{(\tilde{r}_{A,k,n} - r^i)^T \Delta x_{k,n}}{\tilde{p}^i_{A,k,n}} - \frac{(\tilde{r}_{A,k,n} - r^j)^T \Delta x_{k,n}}{\tilde{p}^j_{A,k,n}} - (\hat{p}^i_{B,k} - \hat{p}^j_{B,k}) + \lambda \nabla \Delta \beta^{ij} + w_{\nabla \Delta \phi^{ij}} \quad (13)$$

Thus, from (12) and (13), we can have the following form:

$$\lambda \Delta \tilde{\varphi}^i_{k,n} \approx \frac{(\tilde{r}_{A,k,n} - r^i)^T \Delta x_{k,n}}{\tilde{p}^i_{A,k,n}} + \lambda \Delta \beta^i_{AB} + w_{\Delta \phi^i_{AB}} \quad (14)$$

$$\lambda \nabla \Delta \tilde{\varphi}^{ij}_{k,n} \approx \quad (15)$$

$$\frac{(\tilde{r}_{A,k,n} - r^i)^T \Delta x_{k,n}}{\tilde{p}^i_{A,k,n}} - \frac{(\tilde{r}_{A,k,n} - r^j)^T \Delta x_{k,n}}{\tilde{p}^j_{A,k,n}} + \lambda \nabla \Delta \beta^{ij} + w_{\nabla \Delta \phi^{ij}}$$

where $\lambda \Delta \tilde{\varphi}^i_{k,n} \triangleq \lambda \Delta \phi^i_k - \tilde{p}^i_{A,k,n} + \hat{p}^i_B(k)$ and $\lambda \nabla \Delta \tilde{\varphi}^{ij}_{k,n} \triangleq \lambda \nabla \Delta \phi^{ij}_{k,n} - \tilde{p}^i_{A,k,n} + \tilde{p}^j_{A,k,n} + (\hat{p}^i_{B,k} - \hat{p}^j_{B,k}).$ Some embodiments test a set of satellites for the presence of multipath in the carrier signals emitted by those satellites. Typically, the set of satellites includes at least six satellites allowing rejecting at least one satellite for position estimation. For example, one embodiment test multipath of each satellite individually and independently of testing other satellites. This embodiment allows identifying a particular satellite effecting accuracy of position estimation without the need for additional computation.

Additionally, or alternatively, one embodiments test the set of satellites collectively. This embodiment reduces the computational burden for the situations where no multipath is detected. However, when the multipath is detected the embodiment performs additional calculations to identify the particular satellites causing the multipath.

Exemplar Embodiments

In some embodiment, an integer ambiguity resolution (IAR) based method is designed to detect and determine the disturbances on received GNSS signals induced by non-light-of-sight (NLOS) signals of one or multiple satellites. This method uses of single differencing (SD) or double differencing (DD) carrier phase measurements collected from two receivers located on a railway vehicle and performs IAR in a sliding window fashion. The IAR is later employed to form a detection statistic to detect NLOS effect. In some implementations, a satellite exclusion procedure is performed to further determine the satellite that is affected by NLOS signals in one satellite case or multiple satellites case. Those embodiments take advantage of high sensitivity to disturbances on carrier phase measurements rather than the code measurements and in maintaining the accuracy of the SD/DD carrier phase relative position solution.

SD Carrier Phase with the Cooperation of N Tracked Satellites

In one embodiment, with the cooperation of N Tracked Satellites, 2N carrier phase measurements are available, and the SD carrier phase measurement vector is given by as follows:

$$l_{k,n} \triangleq \lambda[\Delta \tilde{\varphi}^1_{k,n}, \Delta \tilde{\varphi}^2_{k,n}, \ldots, \Delta \tilde{\varphi}^N_{k,n}]^T \quad (16)$$

According to (14), (16) is evaluated as:

$$l_{k,n} = \begin{bmatrix} \frac{(\tilde{r}_{A,k,n} - r^1)^T}{\tilde{p}^1_{A,k,n}} \\ \vdots \\ \frac{(\tilde{r}_{A,k,n} - r^N)^T}{\tilde{p}^N_{A,k,n}} \end{bmatrix} \Delta x_{k,n} + \begin{bmatrix} \lambda \Delta \beta^1_{AB} \\ \vdots \\ \lambda \Delta \beta^N_{AB} \end{bmatrix} + w_{\Delta \Phi_{AB}} \quad (17)$$

$$= A_{k,n} \Delta x_{k,n} + \lambda \Delta \beta + w_{\Delta \Phi_{AB}}$$

where $$A_{k,n} \triangleq \begin{bmatrix} \frac{(\tilde{r}_{A,k,n} - r^1)^T}{\tilde{p}^1_{A,k,n}} \\ \vdots \\ \frac{(\tilde{r}_{A,k,n} - r^N)^T}{\tilde{p}^N_{A,k,n}} \end{bmatrix}, \quad (18)$$

$\Delta \beta \triangleq \lambda[\Delta \beta^1, \Delta \beta^2, \ldots, \Delta \beta^N]^T$, and $w_{\Delta \Phi_{AB}} \triangleq \left[ w_{\Delta \phi^1_{AB}}, w_{\Delta \phi^2_{AB}}, \ldots, w_{\Delta \phi^N_{AB}} \right]^T.$ DD Carrier Phase with the Cooperation of N Tracked Satellites In one embodiment, with the cooperation of N Tracked Satellites, 2N carrier phase measurements are available. Using the first satellite as the reference satellite, and the DD carrier phase measurement vector is given by as follow:

$$l_{k,n} \triangleq \lambda[\nabla \Delta \tilde{\varphi}^{2,1}_{k,n}, \nabla \Delta \tilde{\varphi}^{3,1}_{k,n}, \ldots, \nabla \Delta \tilde{\varphi}^{N,1}_{k,n}]^T \quad (19)$$

According to (15), (19) is evaluated as:

$$l_{k,n} = \begin{bmatrix} \frac{(\tilde{r}_{A,k,n} - r^2)^T}{\tilde{\rho}_{A,k,n}^2} - \frac{(\tilde{r}_{A,k,n} - r^1)^T}{\tilde{\rho}_{A,k,n}^1} \\ \vdots \\ \frac{(\tilde{r}_{A,k,n} - r^N)^T}{\tilde{\rho}_{A,k,n}^N} - \frac{(\tilde{r}_{A,k,n} - r^1)^T}{\tilde{\rho}_{A,k,n}^1} \end{bmatrix} \Delta x_{k,n} + \begin{bmatrix} \lambda \nabla \Delta \beta_{AB}^{21} \\ \vdots \\ \lambda \nabla \Delta \beta_{AB}^{N1} \end{bmatrix} + w_{\nabla \Delta \Phi_{AB}} \quad (20)$$

$$= A_{k,n} \Delta x_{k,n} + \lambda \nabla \Delta \beta + w_{\nabla \Delta \Phi_{AB}}$$

where $$A_{k,n} \triangleq \begin{bmatrix} \frac{(\tilde{r}_{A,k,n} - r^2)^T}{\tilde{\rho}_{A,k,n}^2} - \frac{(\tilde{r}_{A,k,n} - r^1)^T}{\tilde{\rho}_{A,k,n}^1} \\ \vdots \\ \frac{(\tilde{r}_{A,k,n} - r^N)^T}{\tilde{\rho}_{A,k,n}^N} - \frac{(\tilde{r}_{A,k,n} - r^1)^T}{\tilde{\rho}_{A,k,n}^1} \end{bmatrix}, \quad (21)$$

$\nabla \Delta \beta = [\nabla \Delta \beta_{AB}^{12} \; \nabla \Delta \beta_{AB}^{13} \; \cdots \; \nabla \Delta \beta_{AB}^{1N}]^T$, and $w_{\nabla \Delta \Phi_{AB}} \triangleq [w_{\nabla \Delta \Phi_{AB}^{12}}, w_{\nabla \Delta \Phi_{AB}^{13}}, \ldots, w_{\nabla \Delta \Phi_{AB}^{1N}}]^T$.

Batch Estimate of Relative Position and Integer Ambiguity

In this embodiment, only the explanation for the DD carrier phase measurements is presented as an example, since the SD carrier phase will share the same methodology.

For a set of M double differencing carrier phase measurement vectors, the estimates for $\Delta x_{k,n}$ and $\nabla \Delta \beta$ can be obtained by minimizing the sum of squares of the residuals as follows:

$$J_{LSQ}(\{\Delta x_{k,n}, \forall k\}, \nabla \Delta \beta) = \sum_{k=1}^{M} (l_{k,n} - A_{k,n} \Delta x_{k,n} - \lambda \nabla \Delta \beta)^T \quad (22)$$
$$Q_{w_{\nabla \Delta \Phi}}^{-1} (l_{k,n} - A_{k,n} \Delta x_{k,n} - \lambda \nabla \Delta \beta)$$
$$= (l_n - A_{x,n} \Delta x_n - A_\beta \nabla \Delta \beta)^T Q^{-1}$$
$$(l_n - A_{x,n} \Delta x_n - A_\beta \nabla \Delta \beta)$$

where $l_n = [l_{1,n}; l_{2,n}; \ldots; l_{M,n}] \in \mathbb{R}^{M(N-1) \times 1}$, $A_{x,n}$=blkdiag $(A_{1,n}, A_{2,n}, \ldots, A_{M,n}) \in \mathbb{R}^{M(N-1) \times 3M}$, $\Delta x_n = [\Delta x_{1,n}; \Delta x_{2,n}; \ldots; \Delta x_{M,n}] \in \mathbb{R}^{2M \times 1}$, and $A_\beta \triangleq \lambda(1_M \lfloor I_{N-1}) \in \mathbb{R}^{M(N-1) \times (N-1)}$, where $1_M$ denotes the M-by-1 vector of ones, $I_{N-1}$ denotes the (N-1)-by-(N-1) identity matrix, and N denotes the Kronecker product. The equivalent error covariance matrix $Q \in \mathbb{R}^{M(N-1) \times M(N-1)}$ is defined by $$Q = (I_M \otimes Q_{w_{\nabla \Delta \Phi}}). \quad (23)$$

To transform (22) into a squared-root information form, we apply the Cholesky decomposition ($R^T R = Q^{-1}$) as noise whitening; that is, we have $$J_{LSQ}(\{\Delta x_{k,n}, \forall k\}, \nabla \Delta \beta) = (y_n - B_{x,n} \Delta x_n - B_\beta \nabla \Delta \beta)^T$$
$$(y_n - B_{x,n} \Delta x_n - B_\beta \nabla \Delta \beta) \quad (24)$$

where $y_n \triangleq R l_n$, $B_{x,n} \triangleq R A_{x,n}$, and $B_\beta \triangleq R A_\beta$.

To isolate the integer ambiguity from the incremental relative distance, we apply the QR decomposition based transform as follows:

$$Q_a \begin{bmatrix} R_{xx,n} & R_{x\beta,n} \\ 0_{N-1 \times 3M} & R_{\beta\beta} \\ 0_{(M(N-1)-3M-N+1) \times 3M} & 0_{(M(N-1)-3M-N+1) \times (N-1)} \end{bmatrix} = [B_{x,n} \; B_\beta] \quad (25)$$

$Q_a$ is an M(N-1)×M(N-1) orthonormal matrix, $R_{xx,n} \in \mathbb{R}^{3M \times 3M}$ and $R_{\beta\beta} \in \mathbb{R}^{(N-1) \times (N-1)}$ are square upper triangular matrices, whereas $R_{x\beta,n} \in \mathbb{R}^{3M \times (N-1)}$ is a regular matrix. Having applied the orthonormal matrix to y, yields, $$[z_{x,n}; z_n; z_{r,n}] = Q_a^T y_n \quad (26)$$

where $z_{x,n} \in \mathbb{R}^{3M \times 1}$ is the joint sufficient statistics for the location and integer ambiguity, $z_n \in \mathbb{R}^{(N-1) \times 1}$ is the sufficient statistics for the integer ambiguity, and $z_{r,n} \in \mathbb{R}^{(M(N-1)-(N-1)-3M) \times 1}$ reflects the residual.

Now applying (26), (24) can be evaluated as:

$$J_{LSQ}(\{\Delta x_{k,n}, \forall k\}, \nabla \Delta \beta) = \quad (27)$$
$$\underbrace{(z_{x,n} - R_{xx,n} \Delta x_n - R_{x\beta,n} \nabla \Delta \beta)^T (z_{x,n} - R_{xx,n} \Delta x_n - R_{x\beta,n} \nabla \Delta \beta)}_{J_2} +$$
$$\underbrace{(z_n - R_{\beta\beta} \nabla \Delta \beta)^T (z_n - R_{\beta\beta} \nabla \Delta \beta)}_{J_3} + z_{r,n}^T z_{r,n}$$

At each iteration, the optimal estimate for $\Delta x$ is given as:

$$\Delta \tilde{x}_{opt,n} = (R_{xx,n})^{-1} (z_{x,n} - R_{x\beta,n} \nabla \Delta \tilde{\beta}_{float,n}) = (R_{xx,n})^{-1} (z_{x,n} - R_{x\beta,n} (R_{\beta\beta})^{-1} z_{\beta,n}) \quad (28)$$

where the float point solution for $\nabla \Delta \beta$ at iteration n is obtained as:

$$\nabla \Delta \tilde{\beta}_{float,n} = (R_{\beta\beta})^{-1} z_{\beta,n} \quad (29)$$

Recall that in (21), $l_{k,n}$ includes of noise, $\nabla \Delta \beta$, and the correction term at iteration n, $\Delta x_{k,n}$, as the iteration continues resulting in $$l_{k,n} = A_{k,n} \Delta x_{k,n} + \lambda \nabla \Delta \beta + w_{\nabla \Delta \Phi_{AB}} \overset{n \to \infty}{\approx} \lambda \nabla \Delta \beta + w_{\nabla \Delta \Phi_{AB}} \quad (30)$$

After the iteration converges $n=n_{end}$, the integer estimation of $\nabla \Delta \beta$ is calculated by $$\nabla \Delta \tilde{\beta} = \text{round}\left(\left(\frac{1}{M}\right) \sum_{k=1}^{M} l_{k,n_{end}}\right). \quad (31)$$

In some embodiments, the first and the second receivers receive a set of carrier signals emitted by a set of satellites. To that end, the geometric relationship 310 includes a combination of geometric relationships between the first and second receivers and each of the satellite in the set of satellites, and wherein the integer ambiguity difference is a combination of integer ambiguity differences of the set of carrier signals.

This embodiment determines a collective integer ambiguity difference based on statistics collected from tracking all satellites together. This embodiment reduces the computational burden for the situations where no multipath is detected. However, when the multipath is detected the embodiment performs additional calculations to identify the particular satellites causing the multipath.

FIG. 4 shows the IAR-based detection statistics used by some embodiments. A matrix 400 including IAR for (N−1) pairs of satellites and M time instances, is formed. Within the matrix 400, an (N−1)×W₁ submatrix denotes the set of IARs which are obtained previously and maintained in the memory.

Figure 5:
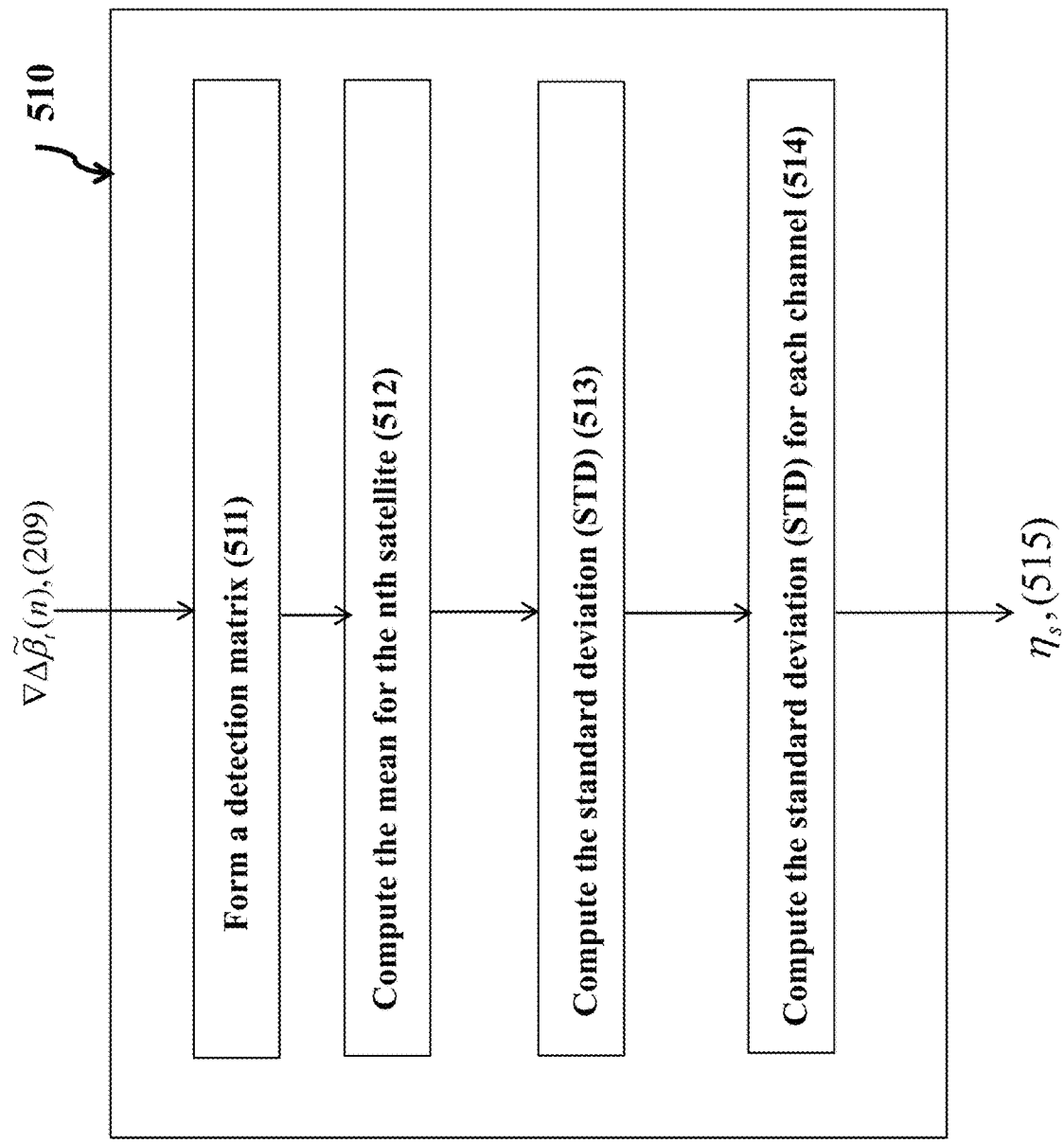
FIG. 5 shows a block diagram of a method for determining the detection statistics according to some embodiments.

FIG. 5 shows a block diagram of a method 520 for determining the detection statistics according to some embodiments. This method is based on the set of IARs, and a set of integer ambiguity differences $\nabla\Delta\tilde{\beta}_t(n)$ s for time instance t and nth pair of satellites.

The method forms 511 a detection matrix 400 and computes 512 the mean for the nth satellite according to $\nabla\Delta\overline{\beta}(n)=\text{mean}(\nabla\Delta\tilde{\beta}_1(n), \ldots, \nabla\Delta\tilde{\beta}_{w_1}(n))$, where $W_1$ denotes the sliding period of time for which the measurements are collected.

Next, the method determines 513 the standard deviation (STD) of the values of the integer ambiguity difference:

$$\sigma = STD(\nabla\Delta\beta_{1:W_1}(1:N-1)).$$

The method determines 514 the STD between the current value of the integer ambiguity difference $\nabla\Delta\tilde{\beta}_s(n), \ldots,$ and the previously obtained and maintained values $\nabla\Delta\overline{\beta}_{(n)}, 1 \leq n \leq (N-1)$, of each carrier signal into one integer ambiguity sum value (515):

$$\eta_S = \left(\frac{1}{N-1}\right)\sum_{n=1}^{N-1}\left(\sqrt{|\nabla\Delta\tilde{\beta}_s(n) - \nabla\Delta\overline{\beta}(n)|^2}\right), W_1+1 \leq s \leq M$$

which is the output from the method 510.

Figure 6:
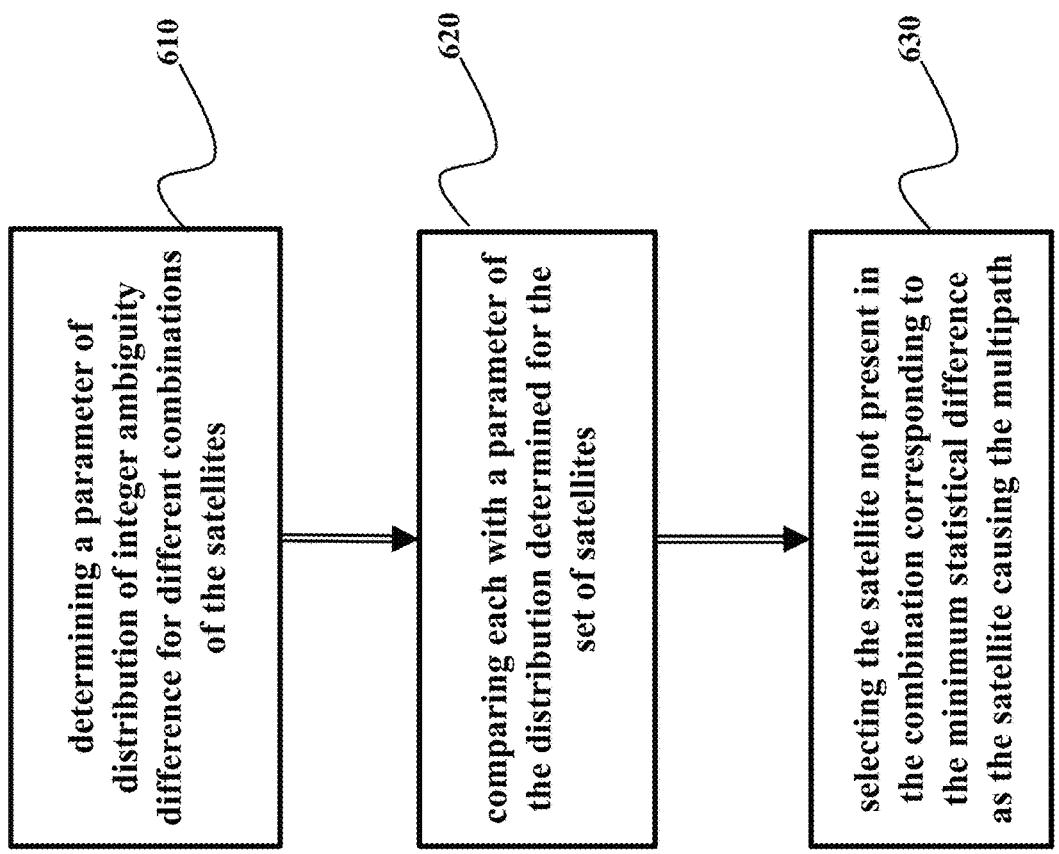
FIG. 6 shows a block diagram of a method for collective integer ambiguity difference tracking according to some embodiments.

FIG. 6 shows a block diagram of a method for collective integer ambiguity difference tracking according to some embodiments. In those embodiments, in response to detecting the multipath, the processor removes the contribution of a particular satellite from the combinations and repeats the computation of the multipath to determine whether the multipath is caused by the particular satellite.

For example, in one implementation, the embodiment determines 610 a parameter of distribution of integer ambiguity difference for different combinations of the satellites to produce a set of parameters. Each combination is formed by removing a different satellite from the set of satellites. The embodiment compares 620 each parameter from the set of parameter with a parameter of the distribution determined for the set of satellites to produce a set of statistical differences and selects 630 the satellite not present in the combination corresponding to the minimum statistical difference as the particular satellite causing the multipath.

Figure 7A:
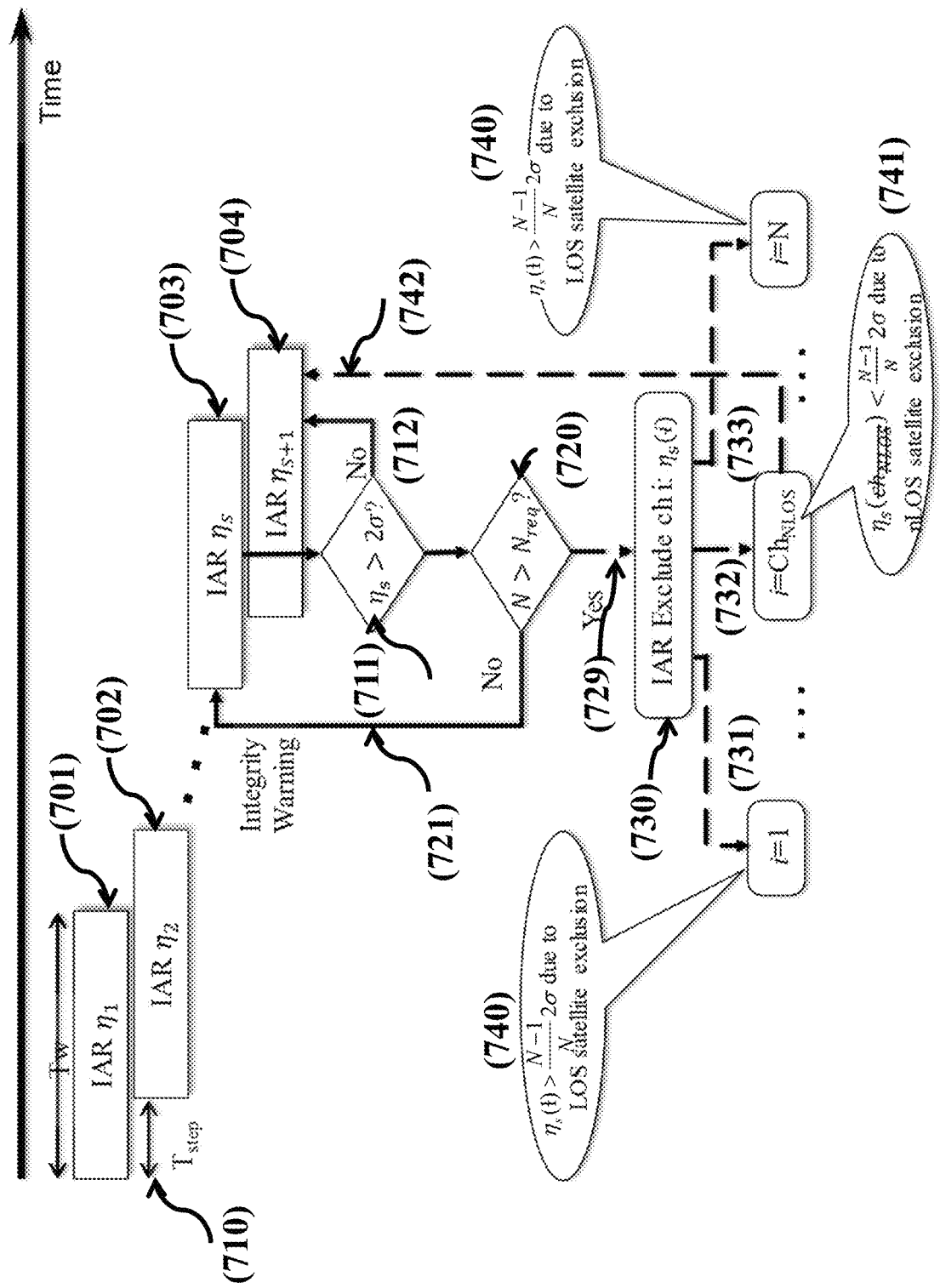
FIG. 7A shows a schematic of a method for collective integer ambiguity difference tracking within a sliding window measurements collected over a period of time according to one embodiment.

FIG. 7A shows a schematic of a method for collective integer ambiguity difference tracking within a sliding window measurements collected over a period of time according to one embodiment. To that end, the measurements of each iteration are determines for a sliding windows 701, 702, 703, and 704. At each sample, the IAR method is applied to a total of $T_W$ of data ($T_W=\Delta t*M$, where $\Delta t$ is the interval between two time instances of measurements) and the IAR for SD and DD $\Delta\beta/\nabla\Delta\beta$ is obtained. The sliding step is denoted by $T_{step}$, (710), which is the time interval between two adjacent samples.

At sample s, based on the IAR obtained by the receiver, a detection statistics $$\eta_S = \left(\frac{1}{N-1}\right)\sum_{n=1}^{N-1}\left(\sqrt{|\nabla\Delta\tilde{\beta}_s(n) - \nabla\Delta\overline{\beta}(n)|^2}\right),$$

$W_1+1 \leq s \leq M$ is formed sequentially (701), . . . , (704). In (711), if $\eta_s > 2\sigma$, where $\sigma$ is the STD calculated from (513), the NLOS is declared to be present in the IAR at sample s. Otherwise, it is recognized in normal IAR.

In step (720), if the number of available satellites exceeds $N_{req}=7$ for DD or $N_{req}=6$ for SD (729), the next step (730) is to examine which satellite introduced this NLOS disturbance by conducting the exclusion process. If not, issue an integrity warning for the IAR at sample s (721), and move on to the next sample s+1 and repeat for the next window.

An exclusion procedure is invoked: from channel 1 to N, (731)-(733), exclude the satellite from a certain channel from the list and then perform IAR to obtain the detection statistics. The detection statistics obtained by excluding channel i is termed as $\eta_s(i)$. For $\eta_s(1)$ through $\eta_s(N)$, there should be only one of these statistics that satisfies $$\eta_s(i) < \frac{N-1}{N}2\sigma, (741),$$

other excluding results in $$\eta_s(i) > \frac{N-1}{N}2\sigma \quad (740).$$

The satellite of that channel which results in $$\eta_s(i) < \frac{N-1}{N}2\sigma$$

is determined as the NLOS affected satellite (742). Further, the embodiment records $\Delta\beta(ch_{NLOS})/\nabla\Delta\beta(ch_{NLOS})$ as $\Delta\beta/\nabla\Delta\beta$ of current sample for subsequent calculation of $\Delta\overline{\beta}/\nabla\Delta\tilde{\beta}$ (742) and update the detection matrix (400).

Figure 7B:
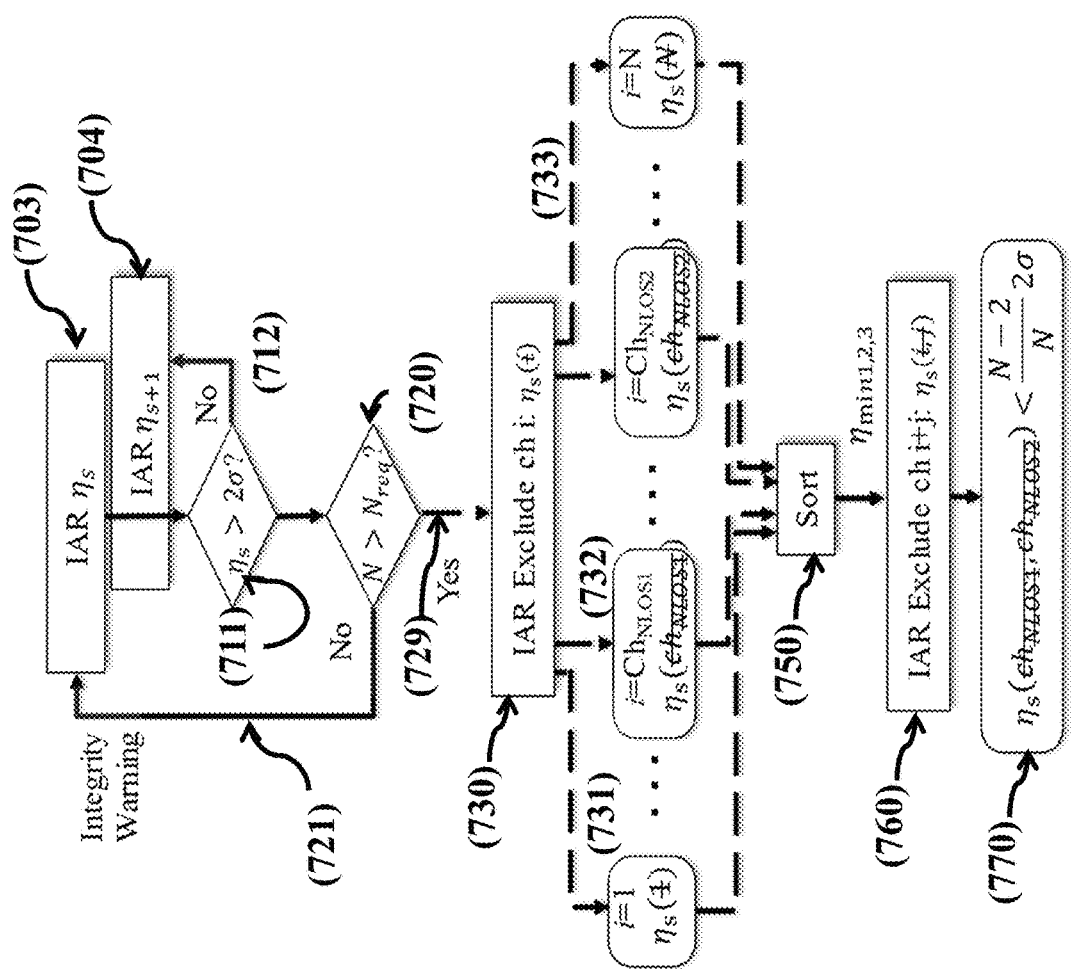
FIG. 7B shows a schematic of a method for collective integer ambiguity difference tracking within a sliding window measurements collected over a period of time according to another embodiment.

FIG. 7B shows a schematic of a method for collective integer ambiguity difference tracking within a sliding window measurements collected over a period of time according to another embodiment. This embodiment also performs IAR in a sliding window manner, (703),(704). Processing up to (731), (732), and (733) are same as those for the embodiment of FIG. 7A. However, the excluding steps (740) and (741) in FIG. 7A are extended in the embodiment of FIG. 7B as steps in (750), (760), and (770).

After exclusion one channel from 1 to N, at each time, computes the statistics, $\eta_s(i)$, which is denoting that ith satellite is excluded. For the set of $\{\eta_s(1), \eta_s(2), \ldots, \eta_s(N)\}$ indicate the number of statistics smaller than $$\frac{N-1}{N}2\sigma.$$

If two satellites cause NLOS, in (750), the embodiment sorts $\{\eta_s(1), \eta_s(2), \ldots, \eta_s(N)\}$ in terms of their magnitudes, and choose three smallest for the satellite exclusion candidates $X_C$. For three possible NLOS satellite pairs, in (760), compute $\{\eta_s(i,j), i, j \in X_C\}$, and then choose one pair that satisfies $$\eta_s(i,j) < \frac{N-2}{N} 2\sigma$$

in (770), which notes that satellite i and j are causing NLOS signal in the carrier phase measurement at this time instance. The corresponding IAR is removed from updating a detection matrix (400).

Figure 8:
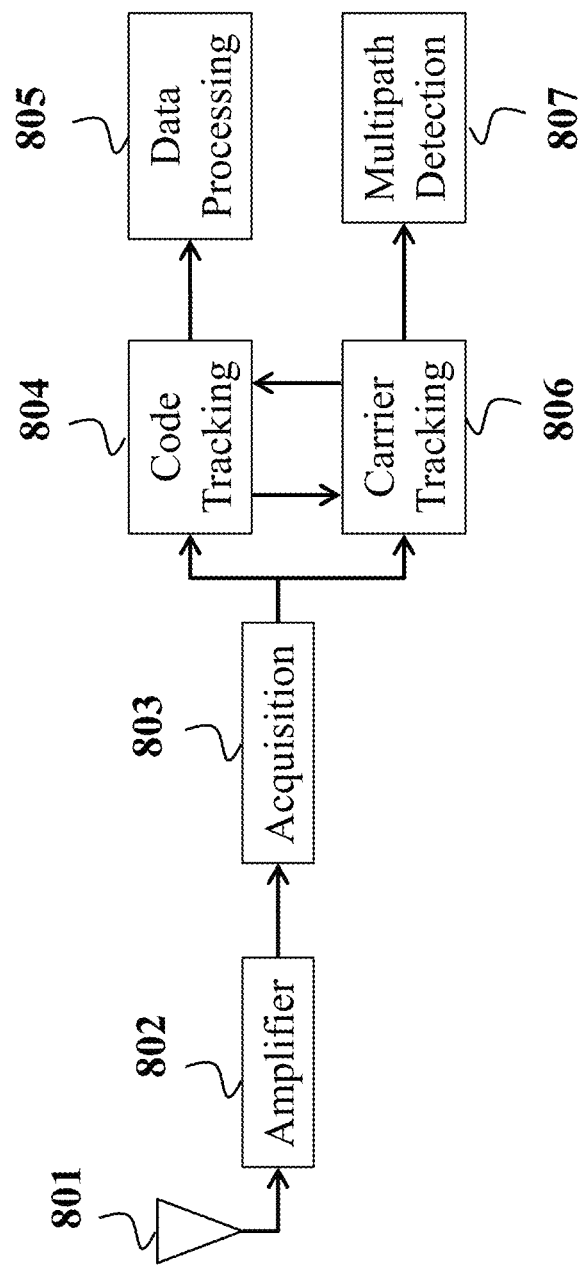
FIG. 8 shows a block diagram of a receiver used by some embodiments.

FIG. 8 shows a block diagram of a receiver used by some embodiments. The measurements required to detect the presence of multipath 807 are natively computed in the receiver as part of the process by which position is estimated. For example, an antenna 801 adapts the satellite signals from propagating through the air to propagating through the wiring of the receiver. After the antenna, and before acquisition, the received signal is made up of the sum of the signals emitted by each satellite. An amplifier 802 is designed to strengthen the signal for further processing. The acquisition 803 initializes the tracking process by supplying estimates for the phase and frequency of each received satellite signal. The tracking unit is tasked with estimating and providing measurements of the phase and frequency of each satellite signal over time for the carrier wave 806 and for code tracking 804. The code tracking 804 is used to determine and process 805 the data messages. The carrier wave tracking 806 is used to determine the multipath 807.

Some GPS receivers can have several antennae for a single receiver, but combinations of several antennae with as many receivers are conceivable. One embodiment uses multiple antennae with as many receivers as antennae. The antennae are spatially separated, which allows the receivers to detect differences between the observed carrier frequencies on the same satellite signal.

Figure 9:
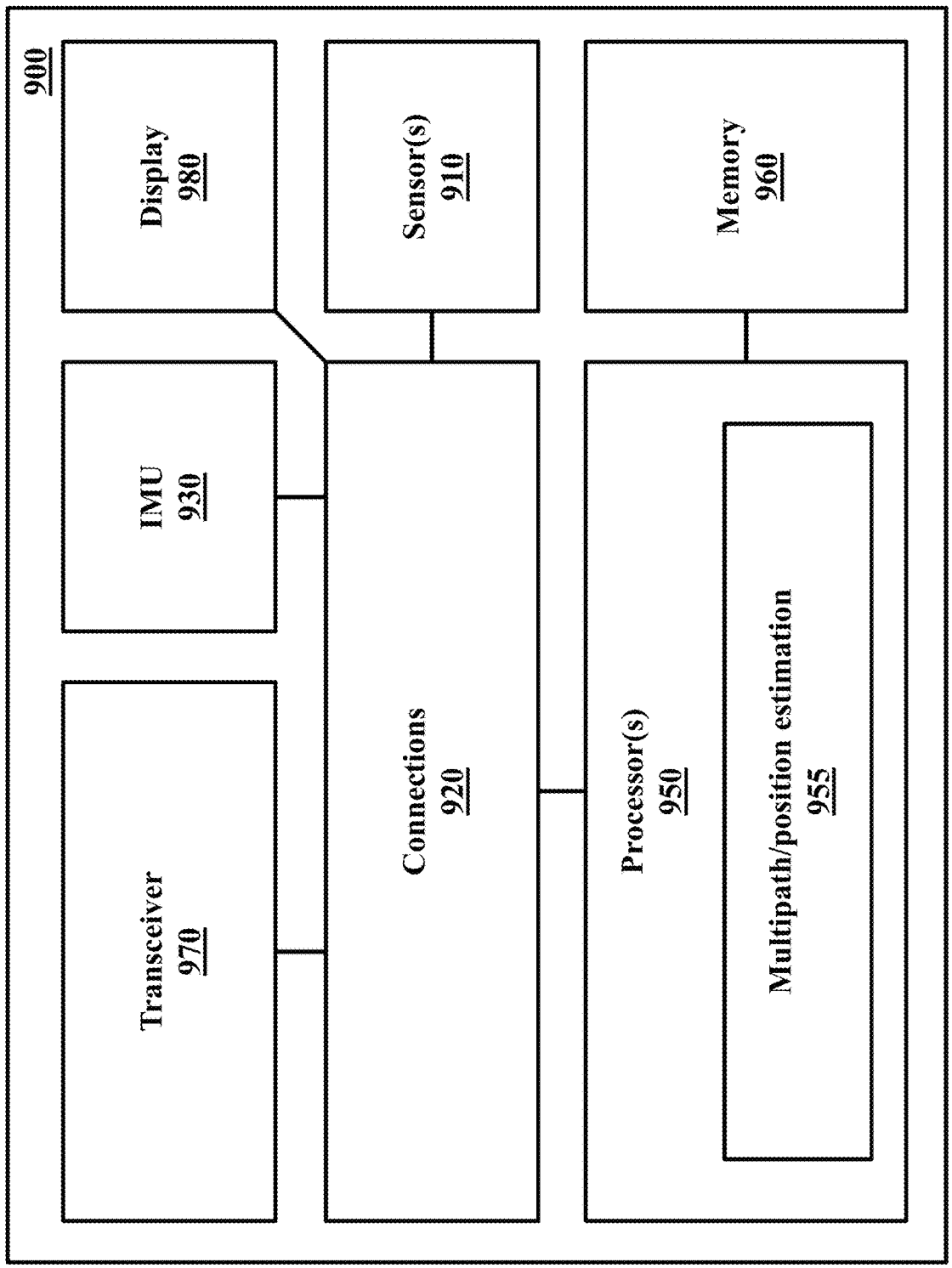
FIG. 9 shows a block diagram of a positioning system according to some embodiments.

FIG. 9 shows a block diagram of a positioning system 900 according to some embodiments. The system 900 can be implemented internal to a vehicle, such as a train 122. Additionally, or alternatively, the system 900 can be communicatively connected to the vehicle 122.

The system 900 can include one or combination of a camera 910, an inertial measurement unit (IMU) 930, a processor 950, a memory 960, a transceiver 970, and a display/screen 980, which can be operatively coupled to other components through connections 920. The connections 920 can comprise buses, lines, fibers, links or combination thereof. The system is configured to implement various multipath and position estimation methods 955 of various embodiments.

The transceiver 970 can, for example, include a transmitter enabled to transmit one or more signals over one or more types of wireless communication networks and a receiver to receive one or more signals transmitted over the one or more types of wireless communication networks. The transceiver 970 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 900 can comprise image sensors such as CCD or CMOS sensors, lasers and/or camera 910, which are hereinafter referred to as "sensor 910". For example, the sensor 910 can convert an optical image into an electronic or digital image and can send acquired images to processor 950. Additionally, or alternatively, the sensor 910 can sense the light reflected from a target object in a scene and submit the intensities of the captured light to the processor 950.

In some embodiments, the processor 950 can also receive input from IMU 930. In other embodiments, the IMU 930 can comprise 3-axis accelerometer(s), 3-axis gyroscope(s), and/or magnetometer(s). The IMU 930 can provide velocity, orientation, and/or other position related information to the processor 950. In some embodiments, the IMU 930 can output measured information in synchronization with the capture of each image frame by the sensor 910. In some embodiments, the output of the IMU 930 is used in part by the processor 950 to fuse the sensor measurements and/or to further process the fused measurements.

The system 900 can also include a screen or display 980 rendering images, such as color and/or depth images. In some embodiments, the display 980 can be used to display live images captured by the sensor 910, fused images, augmented reality (AR) images, graphical user interfaces (GUIs), and other program outputs. In some embodiments, the display 980 can include and/or be housed with a touchscreen to permit users to input data via some combination of virtual keyboards, icons, menus, or other GUIs, user gestures and/or input devices such as styli and other writing implements. In some embodiments, the display 980 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 980 or submitted to different applications that can be internal or external to the system 900.

Exemplary system 900 can also be modified in various ways in a manner consistent with the disclosure, such as, by adding, combining, or omitting one or more of the functional blocks shown. For example, in some configurations, the system 900 does not include the IMU 930 or the transceiver 970. Further, in certain example implementations, the system 900 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 950 can be implemented using a combination of hardware, firmware, and software. The processor 950 can represent one or more circuits configurable to perform at least a portion of a computing procedure or process related to sensor fusion and/or methods for further processing the fused measurements. The processor 950 retrieves instructions and/or data from memory 960. The processor 950 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 960 can be implemented within the processor 950 and/or external to the processor 950. As used herein the term "memory" refers to any type of long term, short term, volatile, nonvolatile, or other memory and is not to be limited to any particular type of memory or number of memories, or type of physical media upon which memory is stored. In some embodiments, the memory 960 holds program codes that facilitate the automated parking.

For example, the memory 960 can store carrier phase measurements, as well as data provided by the IMU 930 and other sensors. The memory 960 can store a memory storing a geometry of the vehicle, a map of the parking space, a kinematic model of the vehicle, a dynamic model of the vehicle, a geometrical relationship between the satellites and the receivers. In general, the memory 960 can represent any data storage mechanism. The memory 960 can include, for example, a primary memory and/or a secondary memory. The primary memory can include, for example, a random access memory, read only memory, etc. While illustrated in FIG. 9 as being separate from the processors 950, it should be understood that all or part of a primary memory can be provided within or otherwise co-located and/or coupled to the processors 950.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 960 and/or the processor 950.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A positioning system for a global navigational satellite system (GNSS), comprising:
a first receiver on a vehicle configured to measure a first carrier phase of a carrier signal emitted by a satellite, wherein the first carrier phase includes a first carrier phase ambiguity as an unknown integer number of wavelengths of the carrier signal travelled between the satellite and the first receiver;
a second receiver on the vehicle configured to measure a second carrier phase of the carrier signal emitted by the satellite, wherein the second carrier phase includes a second carrier phase ambiguity as an unknown integer number of wavelengths of the carrier signal travelled between the satellite and the second receiver;
and a processor configured to determine an integer ambiguity difference between the first carrier phase ambiguity and the second carrier phase ambiguity from a difference in the measurements of the first carrier phase and the second carrier phase and to detect a multipath of the carrier signal based on a value of the integer ambiguity difference.

2. The system of claim 1, wherein the processor tracks values of the integer ambiguity difference over a period of time to produce a distribution of tracked values of the integer ambiguity difference, and wherein the processor, in response to determining a value of the integer ambiguity difference at an instant of time, detects the multipath when a deviation of the integer ambiguity difference from the distribution is above a threshold, and otherwise updates the distribution with the value of the integer ambiguity difference.

3. The system of claim 2, wherein the distribution is a probability distribution having a variance, and wherein the processor detects multipath when the deviation is greater than the variance.

4. The system of claim 3, wherein the first receiver is spatially separated from the second receiver over a predetermined distance, wherein the processor determines the integer ambiguity difference according to a geometric relationship between the satellite and the first and second receivers connecting the integer ambiguity difference with a relative positions error of the first and the second receivers and a difference between the measurements of the first carrier phase and the second carrier phase, wherein the determining iteratively updates the integer ambiguity difference to reduce the relative positions error over a set of measurements of the first carrier phase and the second carrier phase such that a distance between the relative positions of the first and the second receivers according to the updated integer ambiguity difference equals the predetermined distance.

5. The system of claim 4, wherein the geometric relationship includes $$l_{k,n} = A_{k,n}\Delta x_{k,n} + \lambda \nabla\Delta\beta + w_{\nabla\Delta\Phi_{AB}},$$

wherein $\nabla\Delta\beta$ is the integer ambiguity difference, $\Delta x_{k,n}$ is the relative positions error of the first receiver and the second receiver at iteration n and measurement k, and $l_{k,n}$ is the difference between the measurements of the first carrier phase and the second carrier phase, $A_{k,n}$ is a geometric matrix of the geometric relationship between the satellite and the first and second receivers, $\lambda$ is the wavelength of the first and the second carrier signals, and $W_{\nabla\Delta\Phi_{AB}}$ represents an error in the measurements plus noise.

6. The GNSS of claim 4, wherein the processor iteratively updates the relative positions error for the set of M measurements collected over the period of time to force $\Delta x_{k,n} \approx 0$ at the last iteration, $n_{end}$, and determines the integer ambiguity difference after the last iteration according to $$\nabla \Delta \hat{\beta}_{int} = \text{round}\left(\left(\frac{1}{\lambda M}\right)\sum_{k=1}^{M} l_{k,n_{end}}\right).$$

7. The system of claim 4, wherein the first and the second receivers receive a set of carrier signals emitted by a set of satellites, wherein the geometric relationship includes a combination of geometric relationships between the first and second receivers and each of the satellite in the set of satellites, and wherein the integer ambiguity difference is a combination of integer ambiguity differences of the set of carrier signals.

8. The system of claim 7, wherein, in response to detecting the multipath, the processor removes the contribution of a particular satellite from the combinations and repeat the computation of the multipath to determine whether the multipath is caused by the particular satellite.

9. The system of claim 7, wherein the processor is configured for
determining a parameter of distribution of integer ambiguity difference for different combinations of the satellites to produce a set of parameters, wherein each combination is formed by removing a different satellite from the set of satellites;
comparing each parameter from the set of parameter with a parameter of the distribution determined for the set of satellites to produce a set of statistical differences; and
selecting the satellite not present in the combination corresponding to the minimum statistical difference as the particular satellite causing the multipath.

10. The system of claim 4, wherein the first and the second receivers receive a set of carrier signals emitted by a set of satellites, and perform the detection of the multipath for each satellite in the set.

11. The system of claim 1, wherein the first carrier phase and the second carrier phase are determined using a double difference approach.

12. The system of claim 1, wherein the processor detects the multipath in response to detecting an impulse change of the value of the integer ambiguity difference.

13. The system of claim 1, wherein the processor rejects the satellite from position estimation when the multipath is detected, and wherein the processor estimates a position of at least one of the first receiver and the second receiver using at least one of a code signal and the carrier signal emitted by the satellite when the multipath is not detected.

14. A method for position estimation using a global navigational satellite system (GNSS) including a first receiver on a vehicle, a second receiver on the vehicle spatially separated from the first receiver over a predetermined distance, and a processor coupled with stored instructions implementing the method, wherein the instructions, when executed by the processor carry out steps of the method, comprising:
measuring a first carrier phase of a carrier signal emitted by a satellite, wherein the first carrier phase includes a first carrier phase ambiguity as an unknown integer number of wavelengths of the carrier signal travelled between the satellite and the first receiver;
measuring a second carrier phase of the carrier signal emitted by the satellite, wherein the second carrier phase includes a second carrier phase ambiguity as an unknown integer number of wavelengths of the carrier signal travelled between the satellite and the second receiver;
determining an integer ambiguity difference between the first carrier phase ambiguity and the second carrier phase ambiguity from a difference in the measurements of the first carrier phase and the second carrier phase;
detecting a multipath of the carrier signal based on a value of the integer ambiguity difference;
rejecting the satellite from the position estimation when the multipath is detected; and otherwise estimating a position of at least one of the first receiver and the second receiver using at least one of a code signal and the carrier signal emitted by the satellite.

15. The method of claim 14, further comprising:
tracking values of the integer ambiguity difference over a period of time to produce a variance of a probability distribution of tracked values of the integer ambiguity difference; and
detecting the multipath when a deviation of the value of the integer ambiguity difference from the distribution greater than the variance.

16. The method of claim 14, wherein the first receiver is spatially separated from the second receiver over a predetermined distance, wherein the integer ambiguity difference is determined according to a geometric relationship between the satellite and the first and second receivers connecting the integer ambiguity difference with a relative positions error of the first and the second receivers and a difference between the measurements of the first carrier phase and the second carrier phase, wherein the determining iteratively updates the integer ambiguity difference to reduce the relative positions error over a set of measurements of the first carrier phase and the second carrier phase such that a distance between the relative positions of the first and the second receivers according to the updated integer ambiguity difference equals the predetermined distance.

17. The method of claim 16, wherein the first and the second receivers receive a set of carrier signals emitted by a set of satellites, wherein the geometric relationship includes a combination of geometric relationships between the first and second receivers and each of the satellite in the set of satellites, and wherein the integer ambiguity difference is a combination of integer ambiguity differences of the set of carrier signals, further comprising in response to detecting the multipath:
determining a parameter of distribution of integer ambiguity difference for different combinations of the satellites to produce a set of parameters, wherein each combination is formed by removing a different satellite from the set of satellites;
comparing each parameter from the set of parameter with a parameter of the distribution determined for the set of satellites to produce a set of statistical differences; and
selecting the satellite not present in the combination corresponding to the minimum statistical difference as a particular satellite causing the multipath.

18. The method of claim 14, wherein the first carrier phase and the second carrier phase are determined using a double difference approach.

19. A non-transitory computer readable storage medium embodied thereon a program executable by a processor for performing a method for position estimation using a global navigational satellite system (GNSS) including a first receiver on a vehicle and a second receiver on the vehicle spatially separated from the first receiver over a predetermined distance the method comprising:

measuring a first carrier phase of a carrier signal emitted by a satellite, wherein the first carrier phase includes a first carrier phase ambiguity as an unknown integer number of wavelengths of the carrier signal travelled between the satellite and the first receiver;

measuring a second carrier phase of the carrier signal emitted by the satellite, wherein the second carrier phase includes a second carrier phase ambiguity as an unknown integer number of wavelengths of the carrier signal travelled between the satellite and the second receiver;

determining an integer ambiguity difference between the first carrier phase ambiguity and the second carrier phase ambiguity from a difference in the measurements of the first carrier phase and the second carrier phase;

detecting a multipath of the carrier signal based on a value of the integer ambiguity difference;

rejecting the satellite from the position estimation when the multipath is detected;

and otherwise estimating a position of at least one of the first receiver and the second receiver using at least one of a code signal and the carrier signal emitted by the satellite.

20. The medium of claim 19, wherein the method further comprising:

tracking values of the integer ambiguity difference over a period of time to produce a variance of a probability distribution of tracked values of the integer ambiguity difference; and detecting the multipath when a deviation of the value of the integer ambiguity difference from the distribution greater than the variance.

\* \* \* \* \*